United States Patent
Mai

(10) Patent No.: US 8,789,472 B2
(45) Date of Patent: Jul. 29, 2014

(54) QUASI SELF-CONTAINED ENERGY STORAGE AND POWER SUPPLY SYSTEM

(75) Inventor: Serge Mai, Montréal (CA)

(73) Assignee: Serise Technologies, Inc., Montreal (CA)

( * ) Notice: Subject to any disclaimer, the term of this patent is extended or adjusted under 35 U.S.C. 154(b) by 383 days.

(21) Appl. No.: 12/597,944

(22) PCT Filed: Apr. 28, 2008

(86) PCT No.: PCT/CA2008/000810
§ 371 (c)(1),
(2), (4) Date: Mar. 12, 2010

(87) PCT Pub. No.: WO2008/134860
PCT Pub. Date: Nov. 13, 2008

(65) Prior Publication Data
US 2010/0282122 A1    Nov. 11, 2010

(30) Foreign Application Priority Data
May 7, 2007    (CA) ...................................... 2588165

(51) Int. Cl.
*B61C 11/00*    (2006.01)
*B61C 3/00*    (2006.01)

(52) U.S. Cl.
USPC ........................... 105/34.2; 105/34.1; 105/49

(58) Field of Classification Search
CPC .................................................. B60L 2200/26
USPC ...................... 105/49–51, 133, 136
See application file for complete search history.

(56) References Cited

U.S. PATENT DOCUMENTS

| 2,589,453 A | | 3/1952 | Bjarne |
| 4,393,957 A | * | 7/1983 | Hawthorne .................... 184/3.1 |
| 6,105,225 A | * | 8/2000 | Torii et al. .................... 29/25.35 |
| 6,397,129 B1 | * | 5/2002 | Lanoix et al. .................... 701/19 |

(Continued)

FOREIGN PATENT DOCUMENTS

| JP | 58021055 A2 | 2/1983 |
| JP | 11098605 A2 | 4/1999 |
| WO | WO 2004/026657 A1 | 4/2004 |

OTHER PUBLICATIONS

International Search Report, Jul. 3, 2008, from International Phase of the instant application.

(Continued)

*Primary Examiner* — Zachary Kuhfuss
(74) *Attorney, Agent, or Firm* — Jackson Patent Law Office

(57) ABSTRACT

Disclosed is a system of energy storage and electrical motorization to be installed on a towed car of a convoy. The system includes an energy storage module having the capacity to receive energy, to accumulate the energy over time and to restore the energy upon request in electrical form; a motor/generator transforming electrical energy into mechanical energy and vice versa. An acceleration detector is configured to generate a first signal, the first signal indicating an acceleration undergone by the car. A controller establishes for establishing commands and provides control signals to different system components according to the first signal energy storage module accumulating or restoring the energy to the electrical converter. The controller is configured to cause the motor/generator to progressively apply a tractive force in response to the first signal, the tractive force being an increasing function of the acceleration indicated by the first signal.

19 Claims, 9 Drawing Sheets

(56) References Cited

U.S. PATENT DOCUMENTS

| | | |
|---|---|---|
| 6,973,880 B2 | 12/2005 | Kumar |
| 2002/0174797 A1 | 11/2002 | Kumar |
| 2005/0039630 A1* | 2/2005 | Kumar et al. .................. 105/35 |
| 2005/0279244 A1* | 12/2005 | Bose .......................... 105/199.2 |
| 2006/0283350 A1* | 12/2006 | Kumar et al. ............. 105/26.05 |

OTHER PUBLICATIONS

Canadian Search Report, Sep. 16, 2010, from application CA2588165 corresponding to the instant application.

Canadian Notice of Allowance, Mar. 14, 2011, from application CA2588165 corresponding to the instant application.

European Search Report and Office Action, May 2, 2012, from application 08748212 Corresponding to the instant application.

English Translation of the Written Opinion of the International Search Authority, Dec. 7, 2009, from International Phase of the instant application.

English Translation of International Preliminary Report on Patentability Chapter II, Dec. 7, 2009, from International Phase of the instant application.

* cited by examiner

QUASI SELF-CONTAINED ENERGY STORAGE AND POWER SUPPLY SYSTEM

FIELD OF THE INVENTION

The present invention relates to a quasi-autonomous system of energy storage and electrical motorization and to any unit, more specifically convoys and trains, comprising at least such a system.

The present invention has specifically as an object a traction aid module and its independent installation on each bogie of a train without substantial change, or any change, in the drive mode of the engine.

Another object of the present invention relates to bogies equipped with the system of the invention and to the cars comprising at least one of these bogies.

The trains comprising at least a car according to the invention constitute also an object of the invention.

Another object of the present invention relates to the use of said system in any unit specifically a convoy, train, bogie or axle and in particular to the use on the carrying axles for road equipment The systems of the present invention which allow recovering of a portion of the energy generated during braking are easy to install and especially allow reducing substantially the power consumption of the locomotive.

PRIOR ART

On the one hand, the equipments developed for hybrid or all-electrical cars are now sufficiently operational and efficient: in terms of reliability, of power and endurance. Systems providing 50 HP and more are available, with a capacity of regenerative braking. The batteries accompanying the motorization offer a good power density and accept very many cycles. The whole of the energy supply and motorization equipment present reduced overall dimensions sized for private passenger type vehicles. Several traditional or specialized car manufacturers propose hybrid or all electrical private passenger type vehicles: Toyota Prius, Chevrolet Chevy Volt, Heuliez-Dassault Cleanova, Electric Renault Kangoo, etc.

In addition, traditional trains (passengers or freight transportation) consist of a locomotive providing tractive power and of a convoy of tracted cars. From a point of view of tractive efforts distribution, this configuration is not optimal since they are concentrated in the locomotive, with underlying adhesion and power density problems.

It is now recognized that trains are optimally motorized by a traction system distributed on the whole train set rather than by a localized tractive effort on one or two locomotives.

For example, the article "Self-propelled trains and trains towed by locomotives" of the database of International Union of Railways comprise the following conclusion (translated extract): "The self-propelled cars with distributed traction are generally regarded as being the best solution for urban and regional displacements, as well as recently for high speed trains. Even if the energy saving is obviously not the main reason for introduction of self-propelled cars, the energetic efficiency criterion clearly favours the concepts of distributed traction."

Moreover, in traditional trains, the car braking is only pneumatic which induces a low capacity of braking energy recovery and the need to replace the brake pads frequently.

Lastly, it is known that a vehicle capable of recovering a whole or part of its kinetic energy while braking, of storing it and of re-using it during acceleration phases will have better fuel conservation and will reduce its environmental impact.

Some patents describe electrical vehicles, hybrid vehicles and their constituent components. Other patents disclose motorized trailers and bogies.

Patent application CA 2430157 presents configurations and different modes of operation of an electric vehicle equipped with a generator with internal combustion, a generator/electric motor, a battery, an electric motor and a mechanical clutch allowing to couple the generator with the internal combustion engine to reload the battery or with the electric motor to increase the tractive effort produced.

Patent application Ser. No. 10/093,717 shows a similar system adapted to a scooter, comprising a generating source of power supplied with a fuel tank, a power converter, a battery, another power converter and its electric engine, and a controller receiving commands from the acceleration and brake handle of the scooter. The invention describes different operating modes and power flows of the electrical system according to braking or acceleration modes selected by the scooter driver.

Patent application WO/1991/012160 describes a tracting vehicle and its trailer and presents means to modulate the braking force of the trailer according to the mechanical constraint measured in the drawbar binding the tractor to its trailer. The object of the invention is the modulation of the pressure of the brake pipe controlling the trailer brakes so as to reduce the stress in the drawbar and to balance the braking forces of the tractor and its trailer. In this invention the concept of using a mechanical stress measurement to evaluate braking is presented, but the modulation of the braking force of the trailer is actuated by the fluid pressure transmitted to the trailer and not in an autonomous way in the trailer itself. In addition, the braking energy is not recovered by generation.

Patent application WO/1996/029224 presents a railway electrical vehicle in which at least one of the bogie's wheels is connected mechanically to an electric locomotive by a mechanical transmission. This document describes the installation of the components in the bogie and the method used to ensure a good transmission of mechanical forces, a reduced volume respecting the railway displacement corridors and an interesting position of the centre of gravity of the unit.

Patent application WO/2000/074964 proposes the use of a trailer attached to an electric tracting vehicle, said trailer supporting a system generating electrical energy made of a fuel tank, a heat engine, a generator and a converter. The electrical energy produced in the trailer is transferred to the tracting vehicle by an electrical connection to charge the battery and to supply the electrical tracting locomotive of said tracting vehicle.

Patent application WO/2003/022665 describes a towed dump body used in a road train especially to transport ore. Said trailer is motorized and has its own source of energy, its own cooling and traction system, and its tractive effort is synchronized by various means with the tractive effort of the road train leading car (double pedal, lever, proportional effort).

Patent application WO/2003/045755 presents a system similar to WO/1991/012160 discussed previously, but directly incorporating an electrical disk or drum-type foundation braking system, controlled by the measurement of the holding braking effort to which is subjected the drawbar linking the trailer to the main vehicle. As in patent application WO/1991/012160 the trailer wheels are passive and can neither produce a tractive effort nor generate the braking energy.

Patent application GB 2425290A proposes a bogie comprising a frame, equipped with a heat or electrical engine, a flywheel and its housing, a reduction gear, transmission gear boxes, hydrostatic converters and transmission shafts coupled with the axles. The system stores energy in the flywheel accelerated by the engine or by the braking of the wheels, and transmits the flywheel energy towards the wheels to accelerate the bogie. The system can be equipped with a controller that prescribes the speed of the axle according to a desired speed requested by an external system.

Lastly, in patent application WO/2007/070988 one proposes the use of a motorized intermediate trailer that can be inserted in a road train. In a substantially identical way to what is proposed in patent application WO/2003/022665, the tractive effort supplied by the intermediate trailer is synchronized with the tractive effort of the leading car, by an optionally wireless communication system.

Descriptions mentioned above show the technical state of the use of electrical energy supplied by a heat engine or an external generator, for traction systems, including the use of an energy storage system and the recovery of the dynamic braking energy, according to an operational mode defined by a conductor or by an external controller. This operational mode seeks to optimize the energy consumption and to reduce the total fuel consumption but requires instructions coming from a conductor or from an external controller to select the traction or braking modes.

One describes also the means to automatically balance the braking force of a convoy by detecting mechanical parameters on the tracting vehicle or its trailer. The purpose of this operational mode is to distribute the braking forces along a convoy but does not allow recovering of the braking energy for subsequent use.

One presents also the means that will allow distributing and increasing the tractive efforts in a convoy by adding motorized trailers carrying their own non renewable energy source, this tractive effort being controlled directly by the leading car. This operational mode which aims at distributing the tractive efforts along a convoy requires having an energy source for each motorized trailer.

There is more particularly a need for a system which can be installed on a tracted vehicle devoid of at least one of the disadvantages of the systems of the former art.

There is thus a requirement for a system which can be installed on a tracted vehicle allowing to reduce the energy consumption by recovering the braking energy, a distribution of the braking and tractive efforts along the convoy, without requiring neither a separate energy source nor a power or external control connection.

There is also a requirement for a tracted vehicle having a tracting and braking capacity, without external intervention, based on the management of its own energy, and allowing to reduce the efforts supplied by the tracting vehicle to accelerate or slow down said tracted vehicle.

There is also a requirement for an autonomous system, without its own source of energy, that can be installed on a trailer or a carrying bogie, having the power characteristics of an electrical vehicle with a battery, a converter, an electrical motor and particularly a controller capable to determine, independently of any external control, the operational mode in traction, braking or idle modes.

GENERAL DESCRIPTION

Preliminary Definitions

Figure 1:
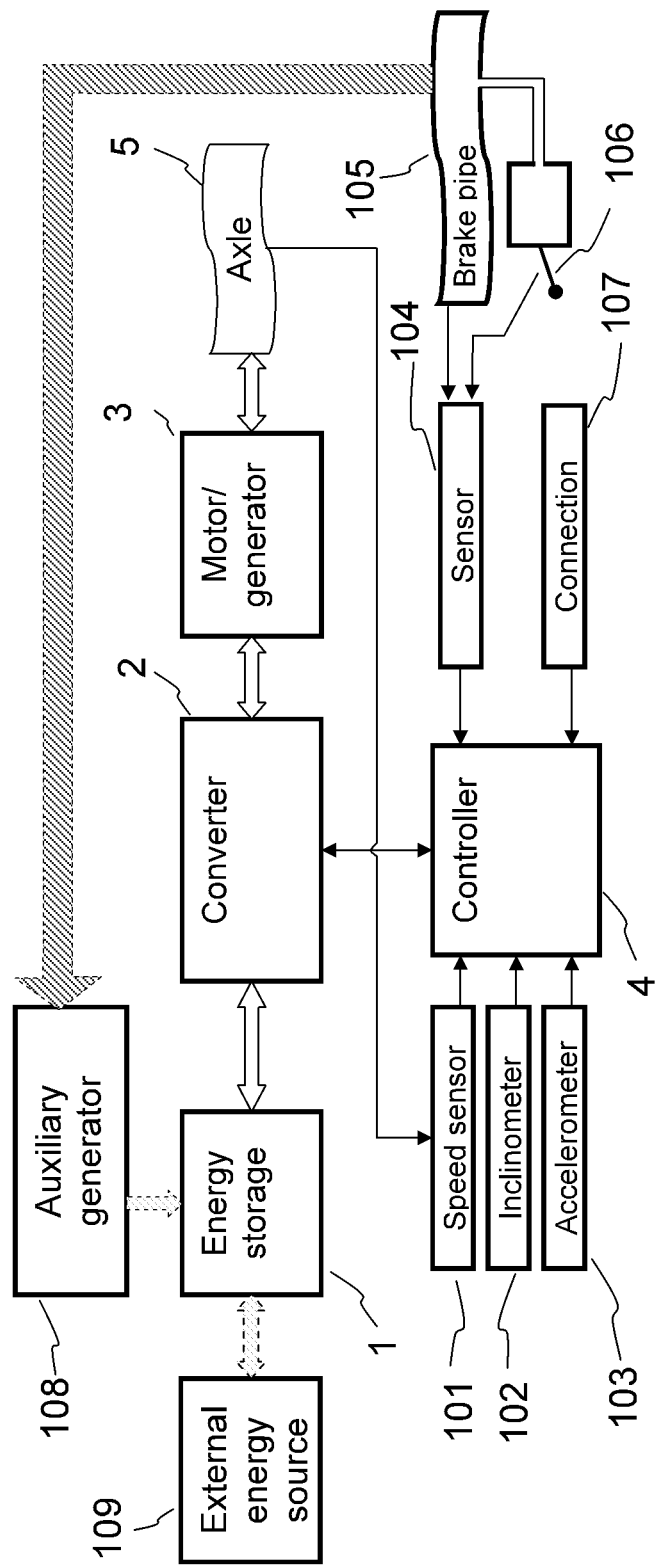
FIG. 1: represents the diagram of a quasi-autonomous system of energy storage and electrical motorization installed on a bogie according to a preferred embodiment of the invention.

Bogie is a carriage located under a railway vehicle, on which the axles are attached (and thus wheels). It is movable from the frame of the vehicle (locomotive, coach or car) and intended to be directed suitably in curves.

Quasi-autonomous: qualifies a system whose energy source is fed only by the energy generated by the system itself when it is put in movement. Preferably such a system has the capacity to move without an external driving force or with an external driving force limited to and lower than the force that would be required to move the system if it were not quasi-autonomous.

Energy storage: system allowing to receive energy, to accumulate it during a non-null time and to restore it on request in electrical form, while limiting as much as possible the losses of energy in the course of time. The energy storage can be done in a mechanical (ex: flywheel, springs), electrical (ex: supercapacitor), pneumatic (ex: compressed air tank), electrochemical (ex: batteries) or hydraulic (ex: force-feed liquid tank) manner.

Electrical converter: system converting the electrical energy supplied/received by the energy storage, into voltage and current adapted for the supply/recovery of the motor/generator energy. One generally qualifies this converter as "four-quadrant" because it allows absorbing or providing energy for positive as well as negative speeds of the engine/generator.

According to the direct (DC) or alternating (AC) form of the electrical energy of the energy storage and of the motor/generator, this converter is a chopper (DC/DC), an inverter or rectifier (DC/AC), or a dual frequency inverter (AC/AC).

Powerplant/generator: electrical rotating machine transforming electrical energy into mechanical energy and inversely. This motor/generator consists of a stator and of a rotor. It can function with direct (DC) or alternating (AC) voltage and current, in synchronous or asynchronous mode. It includes a mechanical connecting system with the shaft or the axle to which it transmits mechanical energy.

Speed sensor: system emitting a digital or analog electric signal providing the measurement of the amplitude and the sign of the rotational speed of the wheels, or of the axle, or of the rotor of the motor/generator. The operation of this sensor uses magnetic, optical or mechanical phenomena.

Alternatively, the speed sensor can provide information on the linear speed of the unit on which it is attached with respect to the ground, by Doppler radar, speed calculation using a GPS, etc Inclinometer: system emitting a digital or analog electrical signal providing the measurement of the amplitude and the sign of the inclination angle compared to the horizontal plane of the support on which it is attached. The operation of this sensor uses mechanical and/or electrical phenomena (for example a capacitive comb becoming deformed under the effect of gravity)

Accelerometer: system emitting a digital or analog electrical signal providing the measurement of the amplitude and the sign of the acceleration of the support on which it is attached in a predefined direction. It is used for example for the longitudinal, lateral and vertical accelerations. The operation of this sensor uses mechanical and/or electrical and/or optical and/or magnetic phenomena: piezoelectric, piezoresistive, optical, Hall effect, etc Controller: electronic calculating system, optionally including software, which establishes the controls and provides the control signals to the different components of the system according to the information received from the various sensors and interfaces.

One generally uses a microprocessor or a microcontroller associated with electronic adapter cards for input/output signals.

Pressure sensor: system emitting a digital or analog electrical signal providing the measurement of the amplitude and the sign of the fluid pressure (for example of the air) in a container or a duct. The operation of this sensor uses mechanical and/or electrical phenomena: piezoelectric, capacitive, etc. The pressure sensor could for example be used to detect a variation of pressure in a pneumatic duct like those used for the railway braking systems.

Mechanical sensor: system emitting a digital or analog electrical signal providing the measurement of the direction, the amplitude and the sign of displacement of a part of the sensor compared to another. The operation of this sensor uses mechanical and/or electrical phenomena: piezoelectric, capacitive, etc. The mechanical sensor could for example be used to detect a displacement of a mechanical brake lever like those used for the railway braking systems.

Connection interface: system allowing the connection of the controller of the invention to an external electronic device 112, in order to collect the information recorded by the controller, to update the programs and parameters, and to control certain special operations of the invention.

Pilot vehicle: vehicle, motorized or non motorized, capable to transmit operational controls towards, and to collect information from another vehicle or a convoy to which the pilot vehicle is connected. A locomotive is an example of motorized pilot vehicle. A car without a locomotive placed ahead of a convoy is an example of a non motorized pilot vehicle.

Objects of the Invention

The present invention specifically relates to the use of technologies and products developed for electrical and hybrid vehicles in a new system allowing to add a quasi-autonomous traction capacity to passive rolling equipment (trailers, carrying bogies, carrying axles, etc), whose control is ensured by sensors and controllers integrated in this same system.

A first object of the invention includes quasi-autonomous systems of storage of energy and electrical motorization intended to be installed on carrying axles or bogies to provide an electrical braking or tractive effort.

According to a first preferred embodiment of the invention, these quasi-autonomous systems of energy storage and electrical motorization include at least one of the following elements:

1) an energy storage module having the capacity to receive energy, to accumulate it during a non null time interval and to restore it upon request in electrical form, and this preferably while limiting as much as possible the losses of energy in the course of time;
2) an electrical converter converting the electrical energy supplied/absorbed by the energy storage module in voltage and current adapted for the supply/recovery of the energy from the motor/generator;
3) a motor/generator, which is preferably an electrical rotating machine, transforming electrical energy into mechanical energy and vice versa; and
4) a controller, preferably a mechanical controller such as a flywheel coupler, and/or an electronic controller such as an electronic calculating system, including optionally software, for establishing commands and providing control signals to different system components according to information received from various sensors and interfaces present in said system, the energy storage module(s) accumulating or restoring the energy to the electrical converter(s), the converter or the electrical converter(s) transferring said energy between the module or the energy storage module(s) and the motor(s)/generator(s), the motor(s)/generator(s) transforming the electrical energy received or supplied from/by the converter(s) into mechanical energy and the controller(s) controlling the transfer(s) of energy between the energy storage module(s), electrical converter and motor/generator elements.

According to another preferred embodiment, these systems comprise at least one of the following elements:

1) an energy storage module having the capacity to receive energy, to accumulate said energy during a non null time interval and to restore said energy upon request in electrical form, and this preferably while limiting to a maximum the losses of energy during the interval;
3) a motor/generator, which is preferably an electrical rotating machine, transforming electrical energy into mechanical energy and vice versa; and
4) a controller, preferably a mechanical controller such as a flywheel coupler, and/or an electronic controller such as an electronic calculating system, including optionally software, for establishing commands and providing control signals to different system components according to information received from various sensors and interfaces present in said system, the energy storage module(s) accumulating or directly restoring energy to the motor(s)/generator(s), the motor(s)/generator(s) transforming the electrical energy into mechanical energy and the controller(s) controlling transfer(s) of energy between the energy storage module(s) and motor/generator elements.

The quasi-autonomous energy storage and electrical motorization systems according to the invention which comprise at least one of the following elements:

1) an energy storage module having the capacity to receive energy, to accumulate said energy during a non null time interval and to restore said energy upon request in electrical form, and this preferably while limiting to a maximum the losses of energy during the interval;
2) an electrical converter converting the electrical energy supplied/absorbed by the energy storage module in voltage and current adapted for the supply/recovery of the energy from the motor/generator;
3) a motor/generator, which is preferably an electrical rotating machine, transforming electrical energy into mechanical energy and vice versa;

and wherein the energy storage module(s) accumulating or restoring energy to the electrical converter(s), the electrical converter(s) transferring the energy between the energy storage module(s) and the motor(s)/generator(s), the motor(s)/generator(s) transforming the electrical energy received or supplied from/by the converter(s) into mechanical energy, are of particular interest.

Preferably, the quasi-autonomous energy storage and electrical motorization systems according to the invention, except for those not including a controller, comprise at least one speed sensor and at least one rotating shaft of the axle or the bogie, said speed sensor being positioned preferably along the rotating shaft of the axle or the bogie, and allowing to identify the direction and the mode of displacement of the axle or the bogie on which the system is installed; the speed information thus collected being preferably used by the controller(s) to optimize the transfer of energy between the energy storage(s) and the motor(s)/generator(s) during at least one of the operations in traction, braking and idle mode to which said system is subjected.

Advantageously, the quasi-autonomous energy storage and electrical motorization systems according to the invention, except for those not including a controller, additionally comprise at least one axle or bogie pressure sensor and pneumatic modules and/or one axle or bogie mechanical sensor and mechanical modules, said pressure sensor being positioned preferably on the axle or bogie pneumatic modules and/or said mechanical sensor being preferably connected to the axle or bogie mechanical modules, and allowing to detect the operation in braking mode of the axle or the bogie on which the system is installed; the braking mode information thus collected being preferably used by the controller(s) to optimize the transfer of energy during at least one of the operations in traction, braking and idle mode to which said systems are subjected.

Preferably, the quasi-autonomous energy storage and electrical motorization systems according to the invention, except for those not including a controller, additionally comprise an inclinometer, preferably added on fixed portions of the components of the system, and allowing to identify a slope of the axle or the bogie on which the system is installed; information related to the slope thus collected being preferably used by the controller(s) to optimize the transfer of energy during at least one of the operations in traction, braking and idle mode to which said systems of the invention are subjected.

Particularly advantageously, the quasi-autonomous energy storage and electrical motorization systems according to the invention additionally comprise, except for those not including a controller, at least one accelerometer, positioned preferably on the fixed portions of the components of the system, and allowing to identify the acceleration of the axle or the bogie on which the system is installed; the acceleration information thus collected being used by the controller to optimize the transfer of energy during at least one of the operations in traction, braking and idle mode to which said systems are subjected.

The quasi-autonomous energy storage and electrical motorization systems according to the invention, except for those not including a controller, additionally preferably comprise at least one preferably electrical and/or electromagnetic and/or optical connection interface, positioned preferably on the controller(s), and this interface allows the connection and/or the communication of the system controller(s) with at least one electrical and/or electronic and/or optical device external to said system.

Advantageously, the quasi-autonomous energy storage and electrical motorization systems according to the invention additionally comprise at least one module 118 for connection with external equipment 114, preferably positioned on the energy storage module, and allowing the bidirectional transfer of energy between one or several equipments external to the system and the energy storage module(s) of said system.

Preferably, the quasi-autonomous energy storage and electrical motorization systems according to the invention additionally comprise an electrical resistance 116, preferably positioned on the energy storage module and/or the electrical converter, and allowing dissipation of eventual energy exceeding the storage capacity of the energy storage module(s) of said system.

Among the quasi-autonomous energy storage and electrical motorization systems according to the invention, those which have the having the capacity to automatically determine the motorization mode required by the movement of the convoy, including traction, braking or idle modes, based on its own sensors, are of very particular interest.

The quasi-autonomous energy storage and electrical motorization systems according to the invention which have the capacity to achieve self-supply of energy, and to store said energy for use during traction phases, are particularly advantageous.

The quasi-autonomous energy storage and electrical motorization systems according to the invention which additionally comprise a compressed-air auxiliary generator capable of:
- transforming the energy accumulated by the compressed-air system from the axle or the bogie, on which said system is installed, into energy storable in the energy storage module of said system; and
- recharging the energy storage module of said system with the compressed-air system, are of particular interest.

According to another advantageous alternative, the quasi-autonomous energy storage and electrical motorization systems according to the invention additionally comprise an auxiliary generator, preferably positioned at the interface between said system and the vehicle frame carried by the axle and/or the bogie on which said system is installed, said auxiliary generator:
- transforming kinetic mechanical energy created by longitudinal, and/or transverse and/or vertical displacements of the vehicle with respect to said system into storable energy in the energy storage module of said system; and
- allowing recharging of the energy storage module of the system with the mechanical energy generated by the displacements.

A second object of the present invention includes the axles equipped with at least one system according to the first object of the invention. The main function of these axles is to operate as carrying axles, and their secondary function is to provide to the vehicle carried by the axles a complementary traction or braking capacity.

Preferably, the axles according to the invention are equipped with at least one of the systems defined in the first object of the invention and their main function is to operate as carrying axles, and their secondary function is to provide to the vehicle carried by the axles a complementary traction or braking capacity.

A third object of the present invention includes bogies equipped with at least one system according to the first object of the invention, the main function of said bogies being to operate as carrying bogies, and their secondary function being to provide to the vehicle carried by the bogies a complementary traction or braking capacity.

Preferably, the main function of the bogies according to the invention is to operate as carrying bogies, and their secondary function is to provide to the vehicle carried by the bogies a complementary traction or braking capacity.

A fourth object of the invention includes quasi-autonomous towable vehicles comprising at least one axle according to the second object of the invention or at least one bogie according to the third object of the invention and a frame connected with said axle and/or bogie.

Advantageously, the towable vehicles of the invention comprise additionally at least one auxiliary generator cumulating the capacities, of transformation of pressure and movements into energy, as previously described.

According to a particularly advantageous embodiment, the storage module(s), the electrical converters, the motor(s)/generator(s) and the controller(s) are installed in available volumes between the frame and the axles of said vehicle or in every other volume allowed by the displacement clearance of said vehicle, the motor(s)/generator(s) being mechanically coupled to at least one axle, and the other elements being mechanically attached to the frame of the vehicle.

As nonrestrictive examples, the towable vehicles according to the invention are selected from the group comprising: railway cars, cars, trailer cars, carriages, buggies, tenders, dump body cars and drays.

A fifth object of the invention includes convoys comprising at least one tracting vehicle at least partially motorized by an external and/or non-regenerable source of energy and a number N of towable vehicles attached to the tracting vehicle(s) or to one or several other towable vehicles. The convoy is characterized in that at least one of the towable vehicles is as defined in the fourth object of the invention.

Advantageously, the convoys according to the invention comprise at least one tracting vehicle at least partially motorized by an external and/or non-regenerable source of energy and a number N of towable vehicles attached to the tracting vehicle(s) or to one or several other towable vehicles and this convoy is characterized in that at least one of the towable vehicles is as defined in the fourth object of the invention.

Preferably, in the convoys according to the invention, the tracting vehicle is a locomotive and the towable vehicle preferably a railway car.

According to another preferred embodiment, the tracting vehicle is a truck and the towable vehicle preferably a trailer.

In the convoys according to the invention, the energy recovered from one of the towable vehicles is used to bring a complementary traction or braking capacity to the convoy.

According to another alternative of interest, the energy recovered in one of the towable vehicles is used to bring a traction or braking capacity during a limited period of time such as a displacement operation of the towable, but not tracted, vehicle, in a yard station.

According to another preferential alternative, in the convoys according to the invention, the energy recovered in one of the towable vehicles is partially transferred to another towable vehicle of said convoy and/or to the tracting vehicle.

Advantageously, the convoys of the invention comprise a number N of towable vehicles attached to one or more other vehicles tractors and these convoys are characterized in that at least one of the towable vehicles is such as defined in the fourth object of the invention.

A sixth object of the invention includes an assembly comprising one or several pilot, not motorized, vehicle(s) and a convoy of a number N of towable vehicles of which at least one of the towable vehicles is defined as in the fourth object of the invention, wherein at least one of said pilot vehicles is characterized by its capacity to transmit and to receive operational commands and status information with at least one of the towable vehicles of the convoy. In this context, the towable vehicle is equipped with a system according to the invention comprising additionally at least one connection interface.

Preferably, the assemblies of the invention comprise one or several pilot, not motorized, vehicle(s) and at least one convoy as defined in the fifth object of the present invention, wherein at least one of the pilot vehicles is characterized by its capacity to transmit and receive operational commands and status information with at least one of the towable vehicles of said convoy, said towable vehicle is then equipped with at least one of the systems defined in the first object of the present invention.

A seventh object of the invention includes the uses of a quasi-autonomous system of electrical motorization according to the first object of the invention, in a convoy in a complementary mode, and not in a principal mode.

Preferably, the quasi-autonomous systems of electrical motorization according to the first object of the present invention are used in a convoy in a complementary mode, and not in a principal mode.

More preferably, the uses of the invention do not have as a first goal to make autonomous the vehicle on which they are installed, but to provide a complementary tracting and/or braking power representing up to 30%, preferably up to 60%, of the required total traction or braking power for said vehicle.

Among the uses of the invention of particular interest, one can mention those including a combination of systems of electric motorization with the initially non-motorized carrying axles, as well as those including a combination of systems of electric motorization with the initially non-motorized carrying bogies.

Description of Preferred Embodiments of the Invention

The invention consists of a quasi-autonomous energy storage and electrical motorization system which can be installed on the carrying bogies of a train of cars to provide an electrical braking or tractive effort.

Moreover the installation of the system of the invention on the bogies of a whole or part of the convoy attached to the motor coach provides, by addition of the powers, a substantial complement of power to the power of the motor coach.

The recharge energy of the energy storage system is mainly obtained by regenerative braking: the mechanical energy generated by the inertia of the convoy or by the traction effort of the motor coach of the convoy, is transmitted from the wheels to the axle, then to the motor/generator, then converted to be stored.

Auxiliary recharging processes can be also considered:
- by connection to the auxiliary circuit (electrical circuit circulating along the convoy to feed the auxiliary systems such as heating or air-conditioning, lighting, etc);
- by a small alternator driven by a pneumatic motor connected to the brake pipe;
- by the recuperation of the energy induced by the movement of the car with respect to the bogie (transverse and vertical movements);
- by external electrical connection when the convoy is stopped (for example using a connection to the electrical network).

The control of traction/braking and charge/discharge modes of the energy storage system is ensured by a microprocessor system and a group of sensors comprising inter alia one or more accelerometers, inclinometers, speed sensors, current and voltage sensors, pressure sensors.

The selection of the mode and the amplitude of traction or braking is based on the acceleration felt by the bogie or the axle, its slope, its speed as well as the pressure or the change in pressure of the brake pipe or the position or the change in position of the braking lever.

A passenger on board a vehicle can evaluate, without using his/her vision, if the vehicle is in acceleration or braking, moving up-hill or down-hill, turning or in a straight line, and in the majority of the cases, if it would be convenient to increase or to reduce the acceleration or braking force of the vehicle. Similarly, the controller according to the invention is programmed to determine with its sensors the kinetic state of the bogie or the axle on which it is embarked: the measured signals are filtered, processed and combined, their evolutions in time are analyzed in order to characterize without ambiguity the current and past kinetic state of the vehicle. According to this information and the braking command, the controller defines the mode and amplitude of traction or braking that must be applied.

For example in a railway application, if the controller detects a positive acceleration and a null or positive slope in the direction of displacement indicating a flat displacement or a rise, it determines that the car on which it is embarked is drawn by the locomotive and the latter is seeking to accelerate the train. The controller then decides to apply and increase very progressively a tractive force to assist the locomotive.

In another case, if a deceleration is detected with a positive slope after a null or negative slope, and if there is no reading of a braking command (pneumatic or mechanical), the controller notes that the train is slowing down on a slope and decides to progressively increase the tractive effort to compensate for this deceleration.

In still another configuration, as soon as a pneumatic or mechanical brake command is detected, and notwithstanding other information, the controller applies an electrical braking force to assist the mechanical braking of the convoy.

Lastly, the controller is programmed to identify, use or ignore the particular accelerations due to the shocks generated by collisions and coupling interplay at the moment of "pull out" of a train or a convoy of trailers.

The parameters of the controller are adjusted to ensure that the complementary braking or tractive efforts brought to the train or the convoy by the invention are progressive while being substantial, and effectively assist the locomotive or the tracting truck while leaving complete and absolute control to the conductor of the train or convoy.

In order to optimize safety, the system according to the invention preferably inhibits any tractive effort at low speeds with a predefined threshold in order to prohibit autonomous startings; according to certain safety criteria, this inhibition could be removed.

Moreover, the system of the invention preserves the safety feature of pneumatic braking (automatic braking when put to atmospheric pressure).

The main constituent elements of the invention are already present in the individual electrical cars:
  energy storage system using electrochemical battery (nickel-cadmium, nickel metal hybrid, acid-lead, lithium ion, polymeric Li-ion, lithium polymeric metal, etc), it is estimated that a weight ranging between 150 and 400 kg and a volume between 0.15 and 0.5 m3 are sufficient for the storage of energy;
  electrical converter: using power semiconductors such as IGBTs or GTOs, in inverter, rectifier or chopper mode, these converters have been existing for over twenty years and are distributed by several manufacturers. It is estimated that a weight of approximately 50 kg and a volume of 0.05 m3 would be necessary;
  motor/generator: compact system of AC electrical motorization (induction motor) or DC motorization (preferably with permanent magnet), of the type of those replacing or complementing typical automobile heat engines in electrical or hybrid cars. It is estimated that a 0.5 m long and 0.35 m diameter motor weighing approximately 60 kg would provide the desired power; and
  an electronic controller with microprocessor programmed for the specific mode of operation of the invention requiring an original processing of information received from the sensors. The electronic controller is installed in order to minimize the acceleration and slope parasitic signals generated by vibrations and shocks due to rolling of the vehicle.

DETAILED DESCRIPTION OF FIGURES

The diagram of FIG. 1 represents the main components of the invention (in bold type) as well as their interfaces with the existing bogie components. The wide arrows represent the energy exchanges, the fine arrows show the information exchanges. The hatched section indicates an optional system.

The energy stored in the energy storage (1) is transmitted in electrical form from/to the motor/generator (3) through an electrical energy converter (2).

The motor/generator (3) converts electrical energy into mechanical energy transmitted towards/from the axle (5).

The controller module (4) receives the following information from the system:
  displacement speed inferred from the rotational speed of the axle measured by a speed sensor (101);
  slope of the frame on which the invention is installed measured by an inclinometer (102);
  acceleration of the frame on which the invention is installed measured by an accelerometer (103);
  braking mode command detected by a sensor (104) measuring the brake pipe pressure (105) and/or detecting the position of the mechanical braking lever (106); and
  optionally, external information transmitted through a connection interface (107), which can be an electrical interface or an electromagnetic interface.

Based on this information, the controller module (4) selects an operational mode and controls the transfer of energy between the energy storage and motor/generator by modulating the flow of energy in the electrical energy converter (2).

The energy stored in the energy storage module (1) comes mainly from the recuperation of the kinetic energy of the train during braking phases. It is possible to add a source of accessory complementary energy through connection of the energy storage module (1) to an auxiliary generator (108) fed for example by a pneumatic motor connected to the brake pipe (105) or by a piezoelectric generator using the mechanical movements of the trailer with respect to the bogie. One can also accessorily connect the energy storage module (1) to an external energy source (109).

Figure 2:
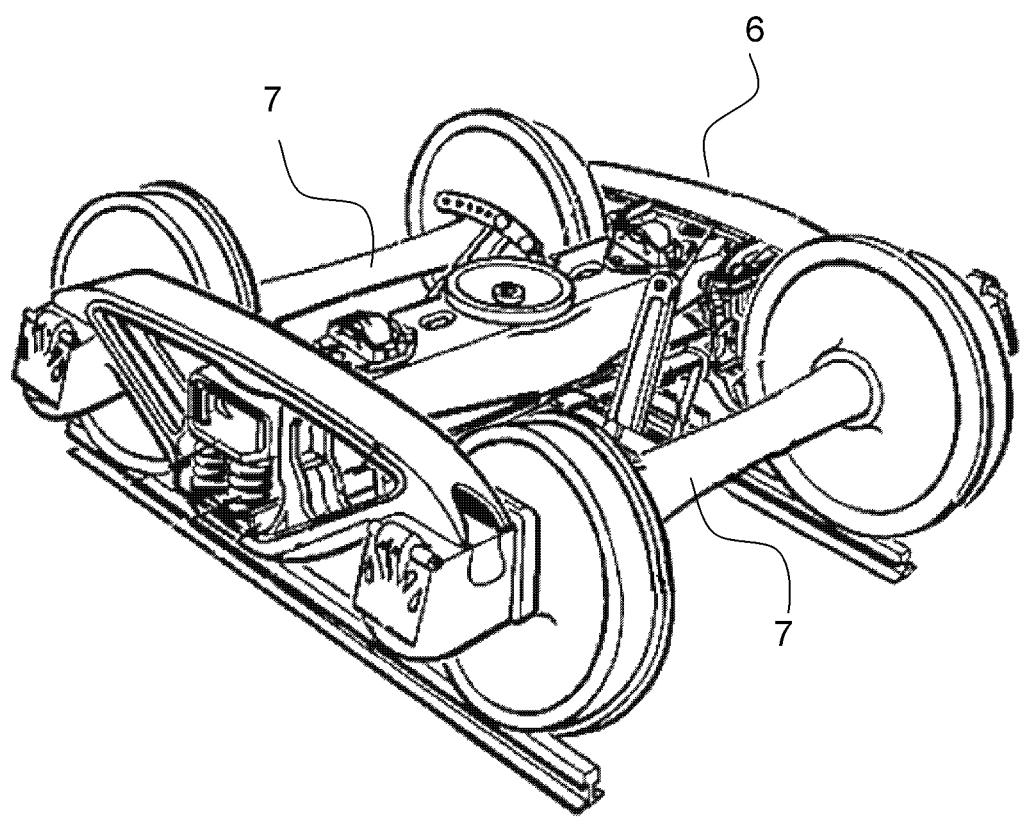
FIG. 2: represents a typical railway carrying bogie not equipped with the invention.

FIG. 2 represents a traditional railway carrying bogie which specifically comprises a frame (6) and two axles (7) wherein no capacity of energy storage, of traction, and of electrical or regenerative braking exists.

Figure 3:
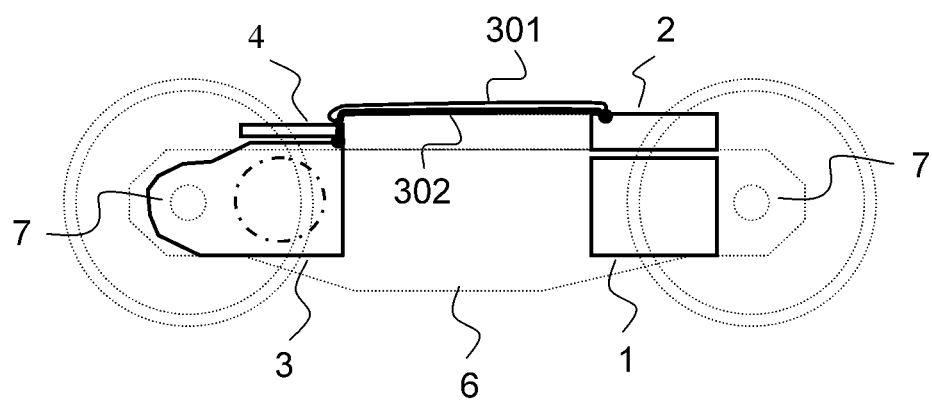
FIG. 3: represents an example of proposed installation of the components of the invention on a bogie, front view.

FIG. 3 is a front view of an installation concept of the components of the invention on a typical railway bogie: energy storage module (1), energy converter (2), motor/generator (3), controller (4) and control (301) and power (302) cables. The installation is done in order to respect the displacement clearance of the bogie and the train, to leave any space necessary to the movements of the different mechanical systems of the bogie: braking lever and shoes, suspension, in order not to limit the clearance of the car with respect to the bogie.

The energy storage module (1) is attached to the frame (6) between two wheels of one of the axles (7). The energy converter (2) is installed on or beside the energy storage module (1). Converted electrical energy is transferred to the motor/generator (3) by the cables (302). Information on the status of the energy storage module (1) and of the converter (2) and the converter (2) control signals are transmitted from the controller (4) by the control cables (301).

The static portion of the motor/generator (3) is attached to the frame (6). The rotating portion of the motor/generator is connected by a rigid or flexible mechanical link to the axle (7) in order to transmit mechanical forces. The controller (4) is installed for example on the motor/generator (3).

Figure 4:
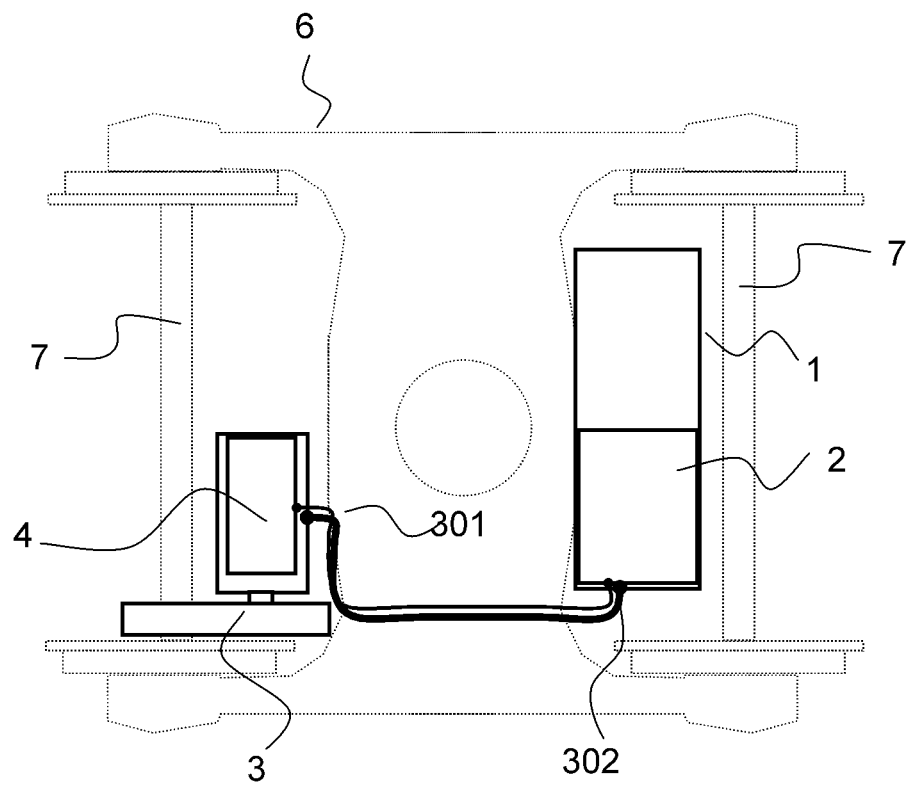
FIG. 4: represents an example of proposed installation of the components of the invention on a bogie, top view corresponding to the front view of FIG. 3.

FIG. 4 represents a top view of the same installation concept of the components of the invention on a typical railway bogie: energy storage (1), energy converter (2), motor/generator (3) and controller (4).

The installation is done in order to respect the displacement clearance of the bogie and the train, to leave any space required for the movements of the different mechanical systems of the bogie: braking lever and shoes, suspension, in order not to limit the clearance of the car with respect to the bogie.

The energy storage module (1) is attached to the frame (6) between two wheels of one of the axles (7). The energy converter (2) is installed on or beside the energy storage module (1). Converted electrical energy is transferred to motor/generator (3) by the cables (302). Information on the status of the energy storage module (1) and of the converter (2) and the converter (2) control signals is transmitted from the controller (4) by the control cables (301).

The static portion of the motor/generator (3) is attached to the frame (6). The rotating portion of motor/generator is connected by a rigid or flexible mechanical bond to the axle (7) in order to transmit mechanical forces. The controller (4) is installed for example on the motor/generator (3).

Figure 5:
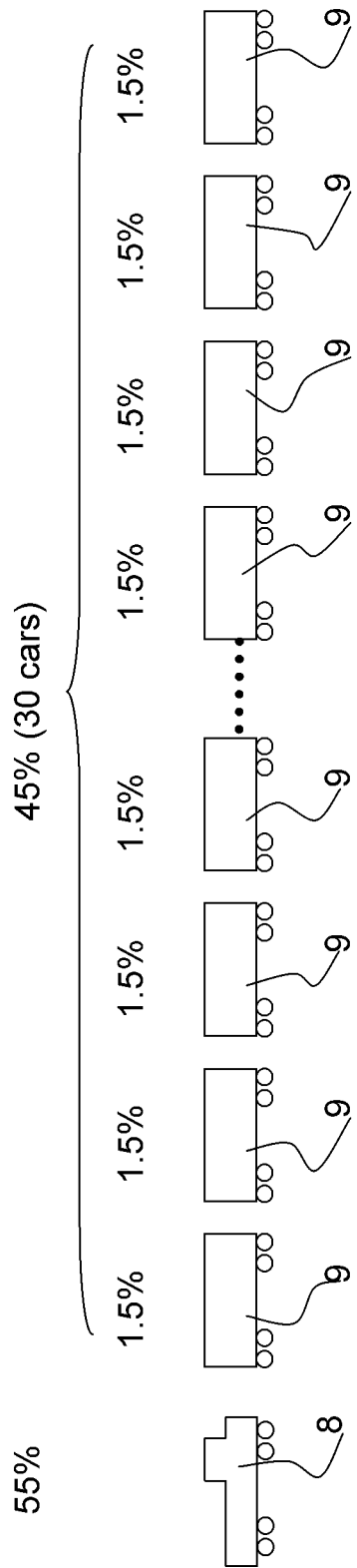
FIG. 5: represents an example of application of the invention on a modified traditional train

FIG. 5 represents an applied example of the invention on a modified traditional train. It consists of a traditional train made up of a locomotive (8) and a convoy of cars (9), wherein each car (9) is equipped with systems according to the invention (a system on each bogie). Quantitative information shown in FIG. 5 is explained below in example 1 of an application of the invention.

FIGS. 6 to 9 represent the energy and speed diagrams of a conventional train not equipped with the invention and of a train equipped with the invention, along a track profile.

The figures are a representation of the speed, power consumption and power storage curves, by a convoy during its travel along a railway track profile, the distance travelled being given in kilometers in the abscissa. The direction of travel of the train is in the increasing direction of the abscissae, from left to right.

Figure 6:
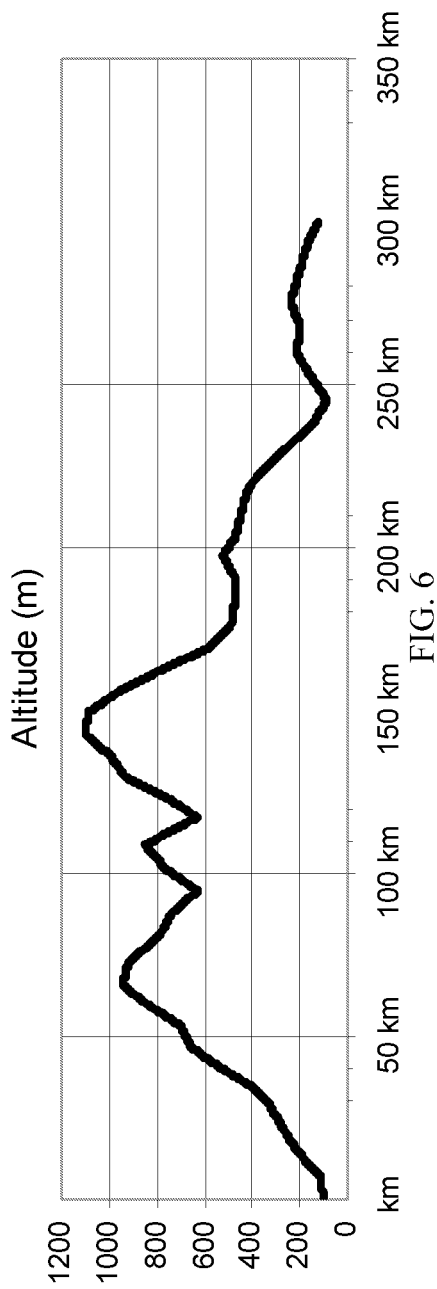
FIGS. 6 to 9: represent the diagrams of energy and speed of a conventional train and of a train equipped with the invention, along a railway track profile.

FIG. 6 presents a variation of altitude in meters along the track profile, as a function of the travelled distance. This curve especially makes it possible to see whether the train is rising or descending.

Figure 7:
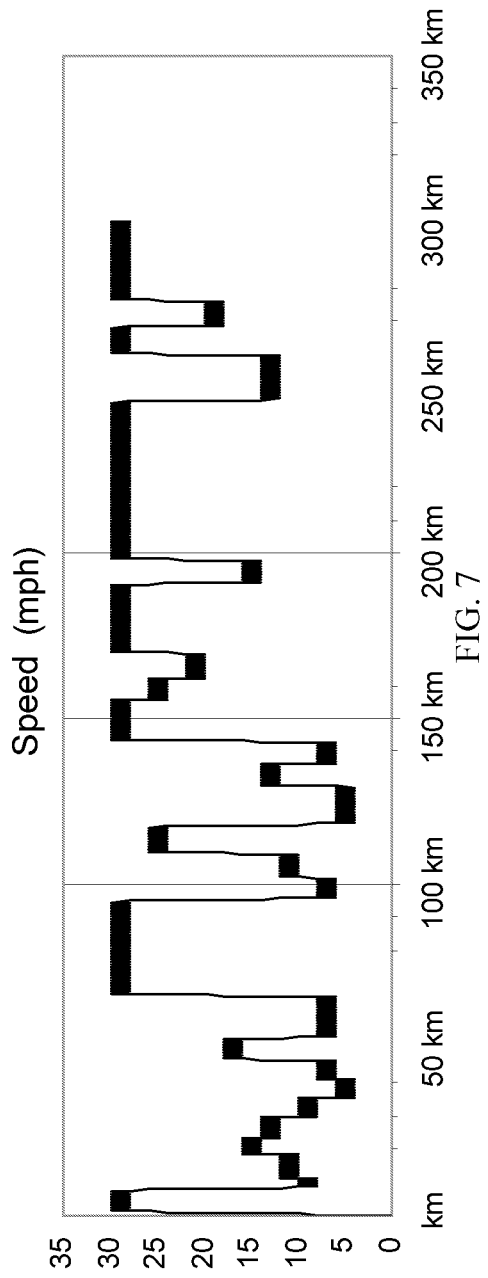

FIG. 7 gives the speed of the train in miles per hour, calculated as a function of the maximum available power and limited to 30 mph. One easily observes the speed variations according to the slope: when the slope is ascending, the speed of the train is reduced since the traction power is limited; when the slope is downward, speed is maximized. One assumes that a train, equipped with the invention or not, must follow this speed profile along its route.

Figure 8:
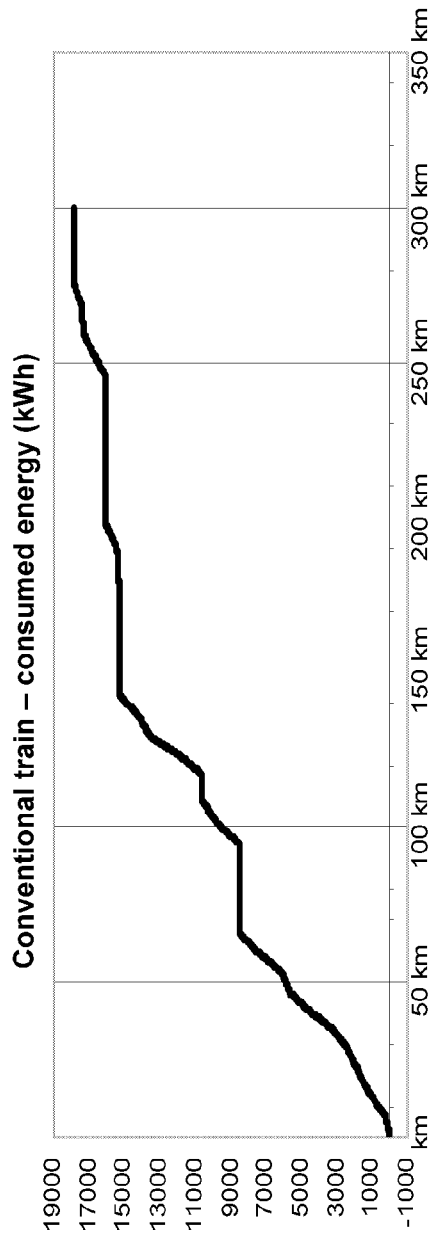

FIG. 8 shows the evolution of the power consumed by the locomotive of a conventional train, not equipped with the invention, in kilowatt-hours. In the rising phases (from 0 to 70 km, 95 to 110 km, 120 km to 140 km, etc) the locomotive provides a tractive effort by using its full power: total consumed energy grows rapidly; in the flat or descent phases (between 70 km to 95 km for example), less power, or even no power (braking mode) is necessary and total consumed energy grows less rapidly.

Figure 9:
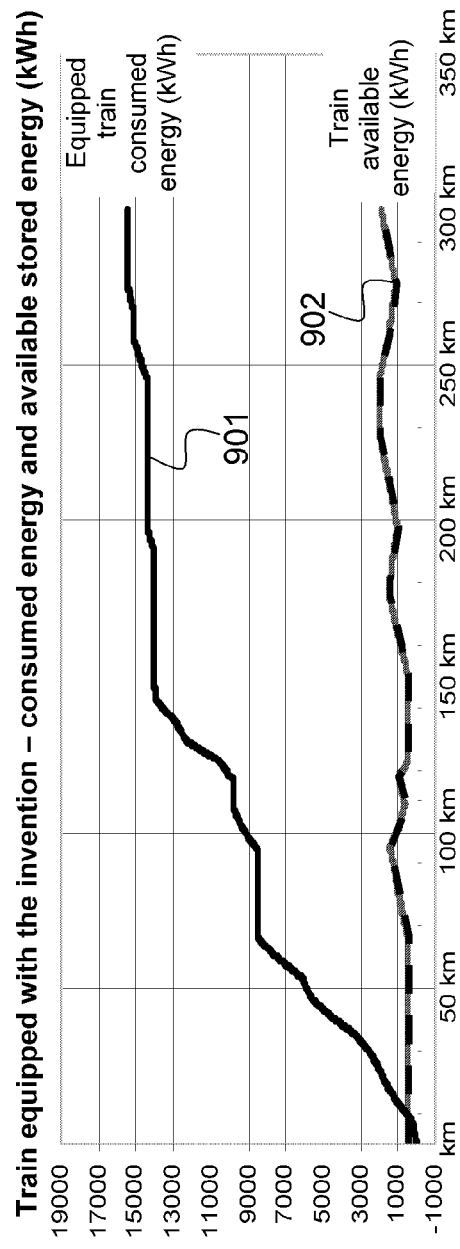

FIG. 9 shows on the curve (901) the evolution of the power consumed by the locomotive of a train equipped with the invention, in kilowatt-hours, and on the curve (902) the evolution of the total available energy stored in the cars equipped with the invention in kilowatt-hours. The assumption is made that the energy storage modules of the invention installed on each coach are initially at their minimum charge and cannot initially provide energy. During the first rising phase (from 0 to 70 km), the power supplied by the locomotive is the same one as that of the train not equipped with the invention, and the accumulation of consumed power follows the same curve (the curve of FIG. 8 and the curve (901) are the same between 0 and 70 km). In the descent phase which follows (of 70 km to 95 km), the train conductor commands the braking mode. The controllers of the invention installed on each car detect this command and each command their converter to apply a braking force via the motor/generator and to store the braking energy in the energy storage module of the invention: available stored energy increases. At the time of entering the following rising phase (95 km to 110 km), each controller detects independently the change of slope as well as the deceleration and decides to transition to traction mode. The energy stored in the invention is then used to provide a tractive effort and consequently to reduce the power that the locomotive of the train equipped with the invention must provide to obtain the same travelling speed as that of the train not equipped with the invention. Consequently, the energy consumption of the locomotive of the train equipped with the invention is reduced, and total consumed energy grows less rapidly. During this same phase, available energy in the energy storage modules of the invention decreases.

In continuing along the route, with alternating phases of rise and descent, the phenomenon is repeated.

The example shown here is calculated for 1 locomotive and 40 cars. The final benefit in this case is a reduction of 2500 kWh: at the point of arrival at 300 km, the curve (901) indicates a total consumption of 15500 kWh for the locomotive of the train equipped with the invention, against 18000 kWh on FIG. 8 for the locomotive of the train not equipped with the invention. The invention allows, under these conditions, a reduction of 14% of fuel consumption on a distance of 300 km.

FIGS. 10 to 13 represent another example of diagrams of energies and speeds of a conventional train not equipped with the invention and of a train equipped with the invention, along a track profile.

The figure is a representation of the speed, power consumption and power storage curves by a convoy during its travel along a railway track profile, the distance travelled being given in kilometers in abscissa. The direction of travel of the train is in the increasing direction of the abscissae, from left to right.

Figure 10:
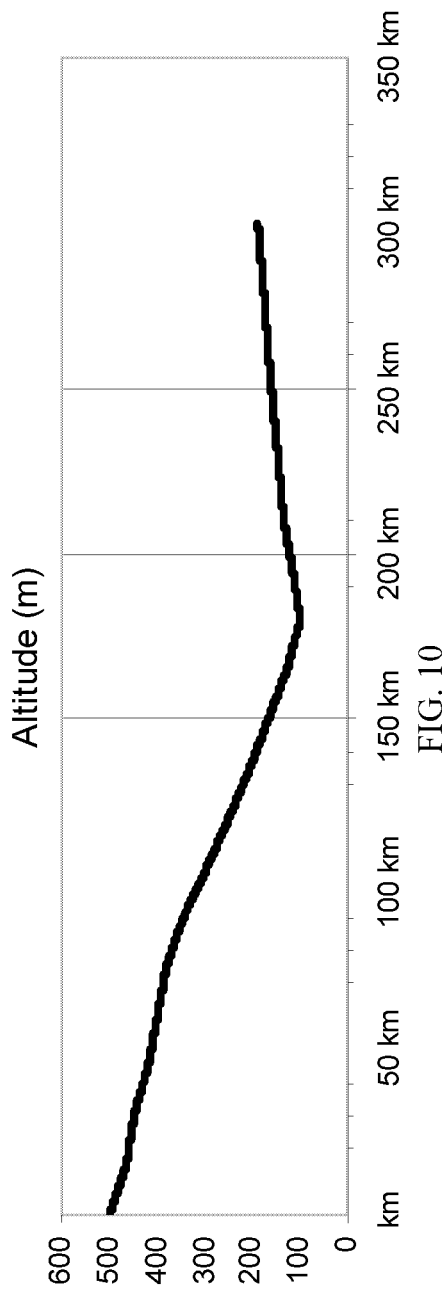
FIGS. 10 to 13: represent another example of diagrams of energies and speed of a conventional train and of a train equipped with the invention, along a railway track profile.

FIG. 10 presents a variation of altitude in meters along the rail profile, according to the distance travelled. This curve especially makes it possible to see whether the train is rising or descending.

Figure 11:
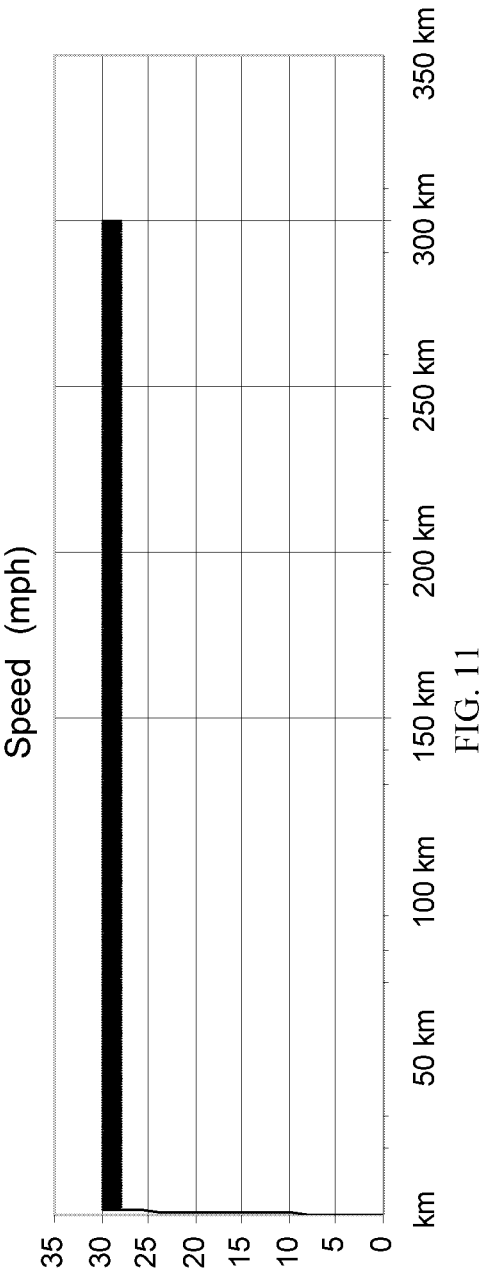

FIG. 11 gives the speed of the train in miles per hour, calculated as a function of the maximum available power and limited to 30 mph. For the considered track profile, the route followed is either descending or in a low inclined ascent: it is thus possible to maintain a constant speed of 30 mph.

Figure 12:
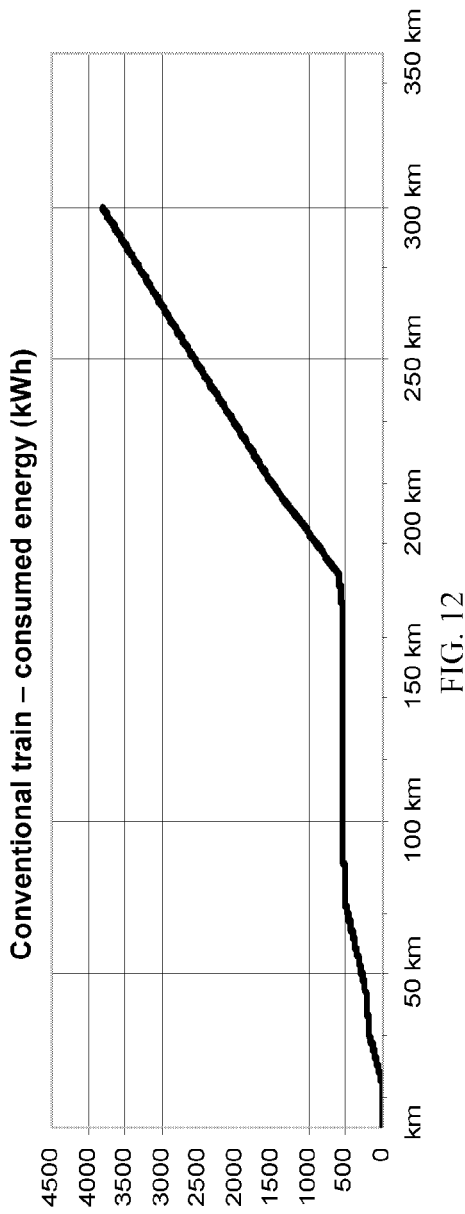

FIG. 12 shows the evolution of power consumption by the locomotive of a conventional train, not equipped with the invention, in kilowatt-hours. From 0 km to 72 km, the downward slope is not sufficient to allow the train to maintain a speed of 30 mph without the locomotive providing effort: the total energy consumed by the locomotive of the train not equipped with the invention thus grows slowly. Between 72 km and 180 km, the downward slope is increased and the train is in braking mode, requiring no effort from the locomotive. Starting from 180 km, the slope becomes ascending and the locomotive must provide more power: the total energy consumed by the locomotive of the train not equipped with the invention increases until reaching 3800 kWh at the point of arrival.

Figure 13:
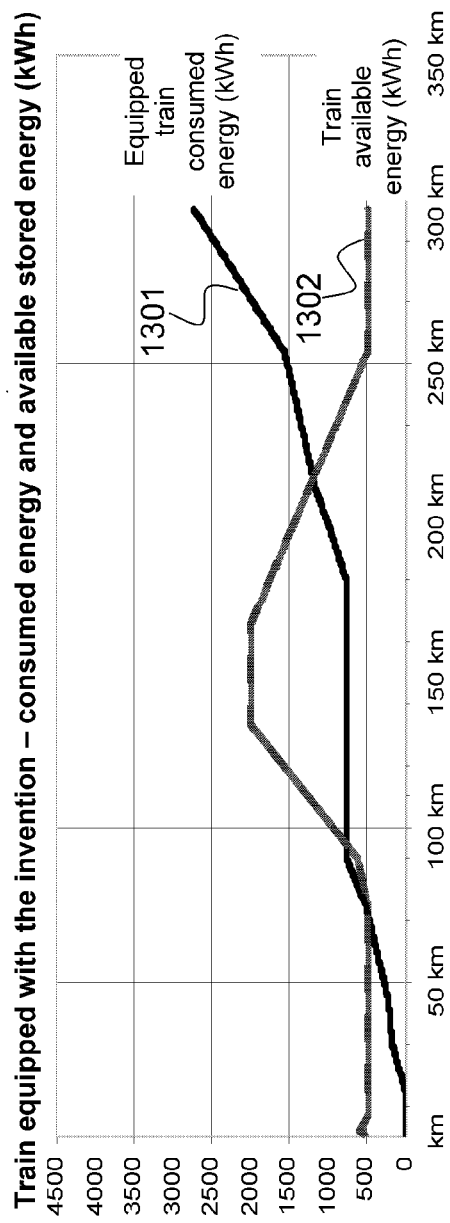
Figure 14:
FIG. 14 is a diagram of an element in an exemplary system.
Figure 15:
FIG. 15 is a diagram of an element in an exemplary system.
Figure 16:
FIG. 16 is a diagram of an element in an exemplary system.
Figure 17:
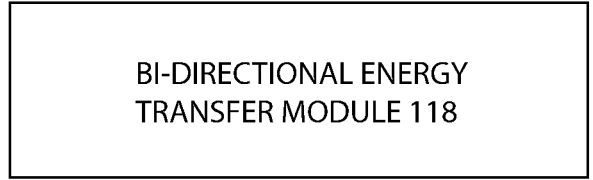
FIG. 17 is a diagram of an element in an exemplary system.

FIG. 13 shows on the curve (1301) the evolution of the power consumption by the locomotive of a train equipped with the invention, in kilowatt-hours, and on the curve (1302) the evolution of the available total energy stored in the cars equipped with the invention in kilowatt-hours. The assumption is made that the energy storage modules of the invention installed on each car are initially at their minimum charge and cannot initially provide energy. From 0 km to 72 km, the downward slope is not sufficient to allow the train to maintain a speed of 30 mph without the locomotive providing effort: the total energy consumed by the locomotive of the train equipped with the invention thus grows slowly in the same manner as the curve of FIG. 12. Between 72 and 90 km, the downward slope is accentuated and braking is requested from the convoy by the locomotive conductor: each controller of the invention detects the braking request and thus decides to apply a braking force which makes it possible to generate energy and to recharge the energy storage modules: the curve (1302) increases. However, the slope is not sufficient to carry the convoy slightly braked by the invention and a tractive effort is necessary on behalf of the locomotive of the train equipped with the invention to maintain a speed of 30 mph, which causes an increase in total consumed energy (1301). This sequence between 72 and 90 km shows how on the low slopes an alternation of traction and braking modes can be used to recharge the energy storage modules while maintaining a desired speed. Between 90 km and 130 km, the stronger slope makes it possible for the convoy to maintain a speed of 30 mph while continuing to recharge the energy storage modules of the invention without requiring any tractive effort from the locomotive. Starting at 130 km, the energy storage modules are full and cannot store energy any more. Between 170 km and 180 km, the slope is less significant and the speed of the convoy is maintained thanks to the tractive efforts supplied by the cars equipped with the invention by drawing energy from the energy storage modules; the locomotive of the train equipped with the invention does not need to apply any tractive effort and thus does not consume energy. Between 180 km and 250 km, the rail profile rises and the locomotive of the train equipped with the invention must provide a tractive effort; since each controller of the invention detects an ascending slope, each car equipped with the invention applies also a tractive effort and the power that the locomotive of the train equipped with the invention must provide is lower than that which the locomotive of the train not equipped must provide, for a same speed of 30 mph: the curve (1301) of the total energy consumed by the locomotive of the train equipped with the invention increases less rapidly than the curve of FIG. 12 of the non-equipped train; simultaneously, the curve (1302) of the total energy stored in the energy storage modules decreases until the modules are at their acceptable minimum. In the final section of 250 km to 300 km, the locomotives of the train equipped with the invention and that of the train not equipped must provide the same power since the energy storage modules cannot provide any more: the slopes of the curve of FIG. 12 and of curve (1301) are the same. Finally, at the point of arrival at 300 km, the locomotive of the train equipped with the invention will have consumed 2750 kWh whereas the locomotive of the train not equipped consumes 3800 kWh: the result is a reduction of 1050 kWh, which is 28% of the fuel consumption.

The profile is even more favourable than that in the case of FIGS. 6 to 9 for the use of a system of energy regeneration in dynamic braking, since the first section of travel is inclined downward making it possible to accumulate energy.

Advantages and Applications

Application of the invention: any train or convoy for which the sum of the moderate unitary powers of the invention installed on each bogie or axle will provide a substantial complement of power to the power of the locomotive or motor coach, proportional to the number of cars equipped with the system.

Among the most obvious advantages of the system according to the invention, one can, in a nonexhaustive way, mention:
- the reduction of the consumption of power of the locomotive or motor coach;
- the reduction of fuel consumption, for the locomotives and motor coaches with heat engines;
- the reduction of greenhouse gas emissions for the locomotives and motor coaches with heat engines;
- recuperation of the braking energy during deceleration and descent phases;
- improved distribution of tractive efforts;
- the significant reduction of the wear of the braking shoes.

Moreover, the invention can be installed independently on each bogie without any change in the drive mode of the locomotive or the motor coach.

According to the number of bogies thus equipped, the operator of the locomotive simply perceives minimal to substantial increases of the acceleration and braking power. The operator can then modulate the effort request accordingly.

The unitary cost of manufacture of the invention is low since it uses components developed for the automotive industry and thus already meets low cost objectives. The cost per kW of the complementary power obtained thanks to this system is clearly lower than that of the remotorisation of a locomotive or an addition of a "tender" for recuperation of braking energy. One estimates the reduction of cost to be about 30 to 50%.

Moreover, the operators can invest in this system in a progressive way and according to their financing capacities and their operational priorities.

The installation of this equipment can be made during periodic maintenance operations for the bogies, during the changes of wheels for example. The maintenance of this product is mainly limited to the maintenance of the energy storage system (not very frequent in the case batteries), which can rapidly be done during the other maintenance operations.

Another application of this system could be the controlled use of this capacity of autonomous traction of the car for short distance travel and at small speed. For example, in railway applications in switch yards, one could move the cars at small speeds by using the energy stored in the system and avoid the use of a locomotive. Another application in road or railway mining convoys would be to move the convoy at small speed for the phases of continuous ore loading, without having to start the driving unit.

The following examples are given on a purely illustrative basis and could not be regarded as representing any limitation of the invention such as it is defined in general.

EXAMPLES

The values indicated in these examples are given on a purely illustrative basis and can vary according to the application and to the mode of use. Designations of the components as well as the commercial names are also given on a purely illustrative basis and do not suppose unicity of such components.

Example 1

Traditional Train Modified According to the Invention The train consists of a locomotive and 30 freight cars as represented in FIG. 5.

The locomotive is dimensioned for a maximum power of 3000 hp. The 30 cars are equipped with a system according to the invention on each of their two bogies, for a total of 60 systems also being able to produce a maximum power of 3000 hp (60×50 hp); 50 hp being the unitary power of the system according to the used invention.

The system according to the invention used to equip the bogies consists of an energy storage module of polymeric lithium metal battery type marketed by the Batscap company under the trade name "Batscap battery", of a converter of the semiconductive type such as an IGBT marketed by the Enova company under the trade name "Inverter 60", of an AC type motor/generator marketed by the Enova company under the trade name "EDU-60", of an electronic controller with microprocessor similar to those used in the industry of electrical vehicles and adapted to the specificities of the invention.

Let us take the case where in a traditional approach, as a function of the acceleration and of the slope, the locomotive should produce a power of 2000 hp. With the use of the invention, each bogie equipped with the invention can easily provide 15 hp during a long duration of time, which is 30 hp per car, which produces an addition of power of 900 hp (30×30), that is to say 45% of the initial power of the locomotive. For a same total tractive effort on the whole of the train, the power supplied by the locomotive is reduced by this same amount and the locomotive should not provide any more than 1100 hp (55% of the initial power).

The energy used by the systems installed on the bogies is then recovered during the braking and descent phases.

Example 2

Use of the System of the Invention in a Marshalling Yard

A second example relates to the use of the system in switch yards, where the cars are divided and assembled into convoys by small power locomotives. Let us imagine that the train to displace contains 10 cars equipped with the invention on each one of their bogies: there are 20 bogies (10×2) each being able to provide 50 hp, therefore a maximum total power of 1000 hp (20×50). This power is very largely sufficient to displace the train at low speeds without any need to use the power of the locomotive, which is a reduction of the consumption of 100% in this case. One can thus carry out in certain cases the switching of cars without any locomotive.

Several other combinations can be explored, one of the main advantages of the invention being the possibility of installing it on a more or less high proportion of cars or trailers without any other consequence than the proportional increase or reduction in the available additional power.

Although the present invention was described using specific embodiments, it is understood that several variations and changes can be made to these embodiments, and the present invention aims to cover such changes, uses or adaptations of the present invention following, in general, the principles of the invention and including any variation of the present description which will become known or conventional in the field of use of the present invention, and which can apply to the essential elements mentioned hereinabove, in accordance with the scope of the following claims.

The invention claimed is:

1. A system of energy storage and electrical motorization for a towed car of a convoy, the convoy being towed by a towing car, the system comprising:
   an energy storage module, on the towed car, having the capacity to receive energy, to accumulate the energy over time and to restore the energy upon request in electrical form;
   a motor/generator, on the towed car, transforming electrical energy into mechanical energy and vice versa;
   an acceleration detector, on the towed car, configured to generate a first signal, the first signal indicating an acceleration undergone by the towed car;
   an inclinometer configured to generate a second signal, the second signal indicating an inclination of the car; and
   a controller, on the towed car, for establishing commands and providing control signals to different system components according to the first signal,
   the energy storage module accumulating energy from or restoring energy to the motor/generator, the motor/generator transforming energy received into mechanical energy and the controller automatically determining a motorization mode required by a movement of the convoy, including traction, braking or idle modes, based on the first signal and controlling the transfer of energy between the energy storage module, and motor/generator,
   the controller being configured to cause the motor/generator to progressively apply a tractive force in response to the first signal indicating a positive acceleration and the second signal indicating a null or positive slope, the tractive force thereby assisting the towing car.

2. The system according to claim 1, further comprising an electrical converter converting the electrical energy supplied/absorbed by the energy storage module into voltage and current adapted for the supply/recovery of the energy of the motor/generator,
   the electrical converter transferring energy between the energy storage module and the motor/generator.

3. The system according to claim 2 wherein the acceleration detector includes a piezoelectric sensor, a piezoresistive sensor, an optical sensor, or a Hall effect sensor.

4. The system according to claim 2 wherein the car includes an axle, and the system further comprises a speed sensor configured to generate speed information for the car, the speed sensor being positioned along the axle, the speed information being used by the controller to optimize the transfer of energy between the energy storage and the motor/generator.

5. The system according to claim 2, further comprising a sensor configured to generate braking mode information for the car, the braking mode information being used by the controller to optimize the transfer of energy.

6. The system according to claim 2, further comprising an interface allowing communication of the controller with a device external to the system, the interface being an electrical interface or an electromagnetic interface.

7. The system according to claim 2, further comprising a module allowing bidirectional transfer of energy between equipment external to the system and the energy storage module.

8. The system according to claim 2, further comprising an electrical resistance allowing dissipation of energy exceeding a storage capacity of the energy storage module.

9. The system according to claim 2, wherein the system is configured to generate electrical energy during a dynamic braking phases, and to store the generated energy for use during traction phases.

10. A bogie equipped with a system according to claim 2, a bogie main function being to operate as a carrying bogie, and a secondary function being to provide to the vehicle carried by the bogie a complementary traction or braking capacity.

11. A quasi-autonomous towable vehicle comprising a bogie according to claim 10 and one frame connected to the bogie.

12. The towable vehicle according to claim 11, wherein the bogie has a plurality of wheels for running on a surface, and the storage module, the electrical converter, the motor/generator and the controller are installed below a plane defined by an uppermost part of the wheels.

13. A convoy comprising a tracting vehicle receiving energy from an external or non-regenerable source of energy and a number N of towable vehicles attached to the tracting vehicle or to one or several other towable vehicles, the convoy being characterized in that one of the towable vehicles is defined by claim 11.

14. The convoy according to claim 13, wherein the tracting vehicle is a locomotive and the towable vehicle is a railway car.

15. The convoy according to claim 13, wherein the energy recovered from one of the towable vehicles is used to bring a complementary traction or braking capacity to the convoy.

16. The convoy according to any one of claim 13, wherein one of the towable vehicles is configured to use energy recovered from dynamic braking to displace the one of the towable vehicles at a time when the one of the towable vehicles is not towed.

17. The convoy according to claim 13, wherein some energy recovered in one of the towable vehicles is transferred to another towable vehicle of the convoy or to the tracting vehicle.

18. A method of operating a convoy including a first vehicle and a second vehicle, the method comprising:
using the first vehicle to tow the second vehicle, wherein the method further comprises the following steps, performed on the second vehicle:
accumulating energy over time and restoring the energy upon request in electrical form;
transforming electrical energy into mechanical energy and vice versa;
detecting an acceleration to generate a first signal, the first signal indicating an acceleration undergone by the second vehicle;
detecting an incline to generate a second signal, the second signal indicating an inclination of the second vehicle; and
providing control signals to different system components according to the first signal, the providing step including causing the transforming step to progressively apply a tractive force in response to the first signal indicating a positive acceleration and the second signal indicating a null or positive slope, the tractive force thereby assisting the first vehicle.

19. A convoy comprising:
a first vehicle;
a second vehicle, the second vehicle being configured to be towed by the first vehicle;
means, on the second vehicle, for accumulating energy over time and restoring the energy upon request in electrical form;
means, on the second vehicle, for transforming electrical energy into mechanical energy and vice versa;
means, on the second vehicle, for detecting an acceleration to generate a first signal, the first signal indicating an acceleration undergone by the second vehicle;
means, on the second vehicle, for detecting an incline to generate a second signal, the second signal indicating an inclination of the second vehicle; and
means for progressively applying a tractive force in response to the first signal indicating a positive acceleration and the second signal indicating a null or positive slope, the tractive force thereby assisting the first vehicle.

* * * * *